Dec. 3, 1968   P. E. PATRICK   3,414,357
INSPECTION APPARATUS AND METHOD
Filed June 22, 1966   3 Sheets-Sheet 1

INVENTOR
PHILLIP E. PATRICK

BY
Woodard, Weikart, Emhardt & Naughton
Attorneys

Dec. 3, 1968 P. E. PATRICK 3,414,357
INSPECTION APPARATUS AND METHOD
Filed June 22, 1966 3 Sheets-Sheet 2

INVENTOR
PHILLIP E. PATRICK

BY
Woodard, Weikart, Emhardt & Naughton
Attorneys

United States Patent Office 3,414,357
Patented Dec. 3, 1968

3,414,357
INSPECTION APPARATUS AND METHOD
Phillip E. Patrick, 4740 Payton St.,
Lawrence, Ind. 46226
Filed June 22, 1966, Ser. No. 559,445
8 Claims. (Cl. 356—165)

This invention relates generally to product inspection and more particularly to apparatus facilitating precision measurements.

For many years it has been common practice to obtain measurements of pitch diameters on gears, screws, and other products by placing gage wires between adjacent teeth thereof and at diametrically opposite locations thereon and making measurements across the wires with micrometer calipers or other measuring instruments. By the use of appropriate calculations or conversion charts based on calculations, the measurements across the wires can be readily converted to the pitch diameter of the measured part.

As the size of parts decreases, the aforementioned method becomes increasingly difficult and the susceptibility to error increases. Moreover, it is even more difficult to attempt to obtain measurements of internal gear or gear die pitch diameters and becomes practically impossible.

It is therefore a general object of the present invention to provide an improved inspection method and apparatus.

A further object is to provide means and a method for measuring accurately the pitch diameter on internal or external gears, gear dies, gear cavities of molding dies, gear electrodes and hobs, screws, and various other tools and products, even in small sizes.

Described briefly, in a typical embodiment of the present invention for checking internal gears, the gear is mounted in a suitable holder in an optical comparator machine with a novel chart provided on the screen of the machine. A reference line is provided on the chart and has a large circle tangent thereto at one point only. The gear shadow on the screen is moved by appropriate horizontal and vertical movements of the work support table of the comparator, to place the shadow, tangent the first circle at two points, each point being on a face of a tooth immediately adjacent a tooth having a face on which the other point is located, these two faces defining a space between the two adjacent teeth.

The position of the part is noted and recorded and it is then moved until the shadow of the diametrically opposite teeth appear on the screen and two points on facing surfaces of adjacent teeth thereon are made tangent to a second circle, identical to the first but on the opposite side of the reference line and tangent to the reference line at the same point as the first circle is tangent to the reference line. A reading is then taken to determine the location of the part necessary to produce this result, and the difference in readings or locations is then used to determine the effective measurement "across the wires" so that the pitch diameter can be determined by calculation or by reference to a chart, in the usual manner.

The full nature of the invention will be understood from the accompanying drawings and the following description and claims.

Figure 3:
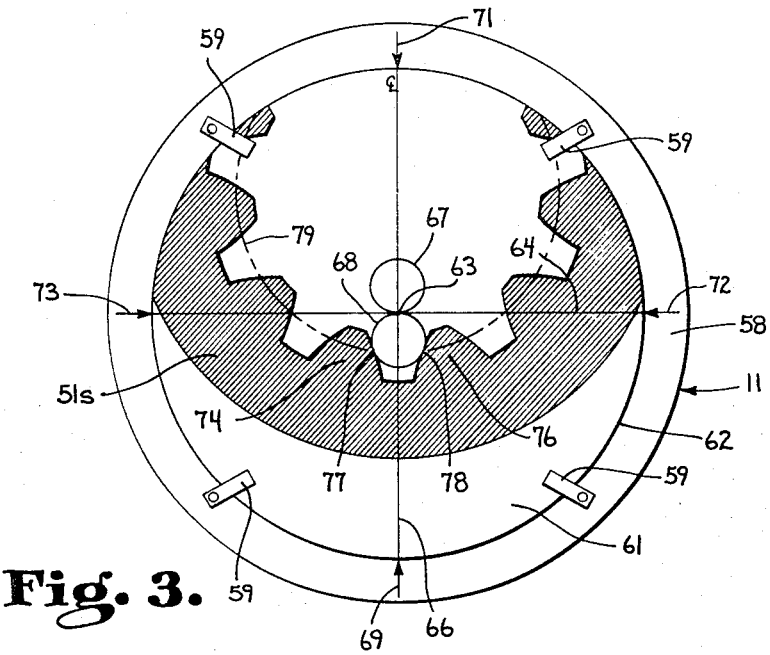
FIGURE 3 is an enlarged frontal fragmentary elevational view thereof showing the novel chart employed on the comparator screen and indicating a first step in the use thereof according to a typical embodiment of the present invention.
Figure 4:
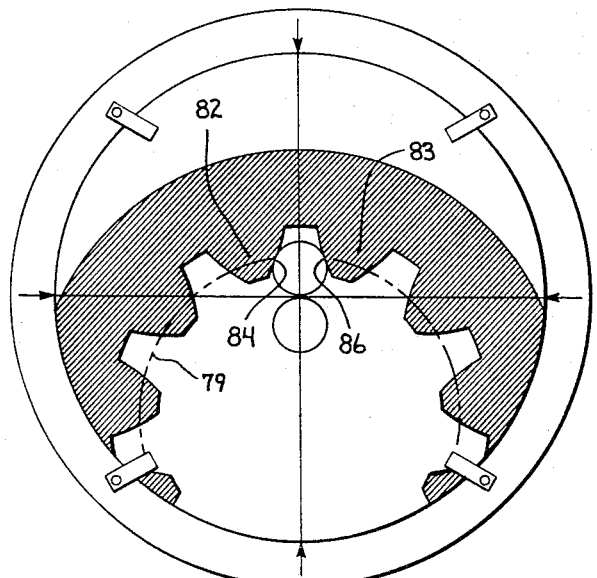
FIGURE 4 is a view like FIGURE 3 but showing a later step in an inspection procedure according to a typical embodiment of the present invention.

The part to be inspected is shown with only six teeth for convenience of illustration, it may have many more than that, as indicated by the shadow representations in FIGURES 3 and 4.

Figure 1:
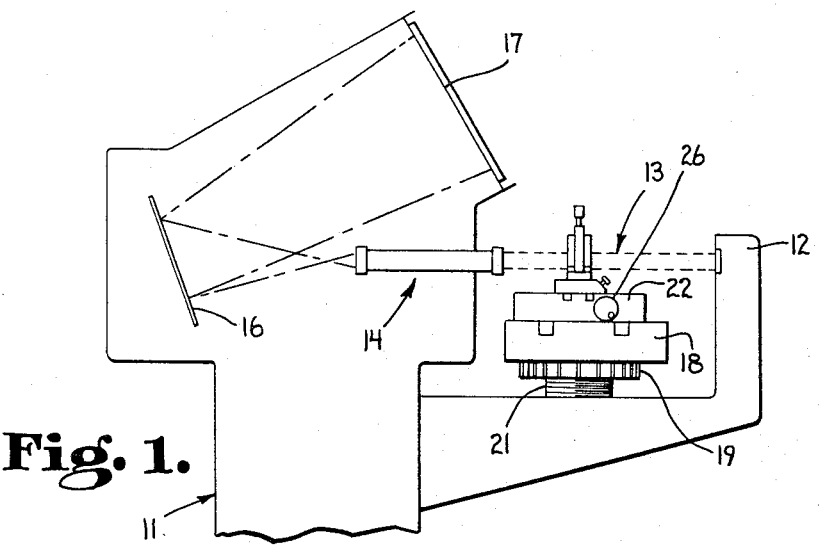
FIGURE 1 is a schematic elevational side view of a comparator machine suitable for the practice of the present invention.

Referring now to the drawings in detail, in FIGURE 1 there is a conventional optical comparator machine 11 having a light source 12 producing a collimated beam of light (designated by the dotted outlines 13) toward the projection lens system 14 from which it is projected onto the flat mirror 16 for reflection onto a viewing screen 17. The comparator has a table 18 which is vertically adjustable by means of the hand-wheel 19 and the screw 21 associated therewith. The table has a plate 22 mounted thereon which is horizontally movable in the direction of the arrows 23, 24 (FIGURE 2) by means of the hand-wheel and crank 26.

Figure 2:
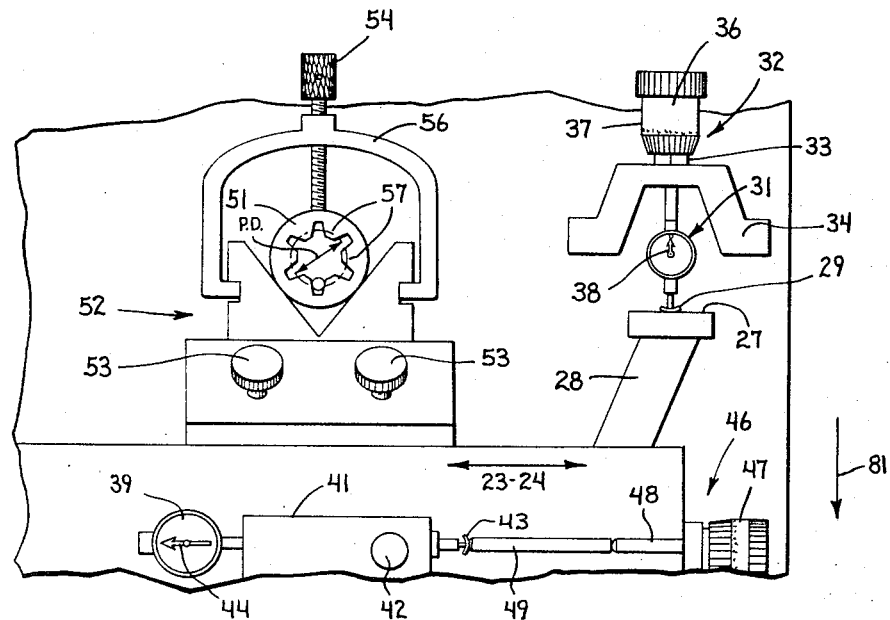
FIGURE 2 is an enlarged fragmentary front elevational view thereof showing the part to be inspected secured in a holder therefor.

For the purpose of obtaining precise vertical measurements, a gaging surface 27 is affixed to the table 18, being at the upper end of a leg 28 affixed to the table. This surface contacts the movable anvil 29 of the dial indicator 31 which is vertically movable by a micrometer 32 having its reference portion 33 affixed to the comparator frame by the bracket 34. Thus, by rotating the micrometer knob 36 and scale 37 therewith, the dial indicator 31 can be raised and lowered which, as indicated in FIGURE 2 where the anvil is resting on the gaging surface, will cause the dial indicator pointer 38 to rotate on the indicator dial.

In a similar manner and further according to conventional practice, a dial indicator 39 is mounted to a block 41 fixable to the table by the thumb screw 42, and the indicator has a movable anvil 43 which operates the pointer 44 in response to linear movement of the anvil. A micrometer 46 including the combination scale and knob 47 and stem 48 is mounted to the horizontally slidable plate 22 and a suitable cylindrical gage bar 49 can be disposed between the micrometer and dial indicator anvil, as desired, if necessary.

The part 51 to be inspected is mounted in a V-block assembly 52, the base of which is affixed to the table plate 22 by means of the thumb screws 53. The part 51 is secured in position by the screw 54 of the V-block clamp 56. The part to be inspected, in this instance, happens to be an internal gear; more specifically a gear with internally projecting teeth 57.

Referring now to FIGURE 3, the comparator screen is circular and has a frame 58 with suitable clips 59 spaced therearound to hold overlay charts securely to the frame. According to the present invention, the chart 61 of transparent material has a circular marginal edge 62 at constant radius from a center 63 and in the practice of the present invention, it is best to have this center centered on the screen. For this purpose, a horizontal reference line 64 is provided on the chart and a vertical reference line 66 is provided on the chart, these intersecting at 90° at the center of the chart. The chart also includes two identical circles 67 and 68, whose centers are located on the reference line 66, these circles being tangent each other at only one point which is at the center 63 of the chart. The diameter of these circles is determined by taking the diameter of the gage wires which would normally be used to check the pitch diameter of the part to be inspected, and multiplying that diameter by the magnification obtained in the comparator, which gives the product of the theoretical gage wire diameter and the number of times the part is magnified in production of its image on the screen. Therefore, when the image of the inspected part is displayed on the comparator screen as indicated in FIGURES 3 and 4, its image size will be in the same proportion to the chart circle size as is the actual part size with respect to the size of the gage wires which would be used for checking pitch diameter by conventional "over the wires" measurement techniques. It will be appreciated that some parts are so small that the space between protrusions (such as between internally projecting teeth of a small gear die for example) is so small that although gage wires of some size are theoretically useful for an "over the wires" measurement, just as with larger parts, as a practical matter it would be very difficult if not impossible to use such small wires according to conventional measurement techniques.

Normally the comparator frame 11 will incorporate a number of graduations around the screen frame 58 to facilitate alignment and centering of the chart thereon. For convenience in illustration, four reference marks are shown in the form of arrows on the screen frame 58, rather than the many graduations typically found on a comparator. The vertical reference line 66 is aligned with the marks 69 and 71, while the horizontal reference mark on the chart is aligned with the horizontal reference marks 72 and 73 on the screen frame.

In the use of the present invention for checking the pitch diameter of the internal gear 51, the table 18 of the comparator is moved horizontally and vertically to the extent required to place the image or shadow 51s in a position on the screen wherein the faces of the teeth 74 and 76 defining the space between these teeth are just tangent the chart circle 68, this occurring at points 77 and 78 which are, therefore, taken as points on the pitch circle 79 of the gear. Then the micrometer knob 36 is turned until the dial indicator anvil 29 contacts the table gaging surface 27 and is turned further until the dial indicator reads zero as indicated in FIGURE 2. Then the micrometer reading is made.

The table is then moved downwardly in the direction of the arrow 81 (FIGURE 2), the shadow on the screen thus moving downward also and in a path parallel to the reference line 66 through the centers of the circles, this reference line being aligned with the vertical reference marks 69 and 71 of the comparator screen. This movement is continued until the tooth surfaces facing the space between the gear teeth 82 and 83 are made tangent the upper chart circle 67, this occurring at points 84 and 86 on the pitch circle 79 of the gear. Again the micrometer knob is turned until the dial indicator anvil 27 contacts the table gaging surface 27 and until the pointer 38 returns to zero. Then the micrometer reading is taken. If it happens that to bring the shadow to a point of tangency of the chart circle 67 with the facing faces of teeth 82 and 83, the necessary table travel is greater than the micrometer travel capability, a suitable gage block can be mounted on the table gaging surface 27 and the anvil 29 can be brought down by the micrometer on top of the gage block and then a reading is taken.

The difference between the micrometer readings (and consideration of the gage block dimension being made in the event it is necessary) will provide the reading "over the wires" from which the diameter of the pitch circle 79 (pitch diameter of the gear) and which is designated by P.D. in FIGURE 2, can be determined.

Figure 5:
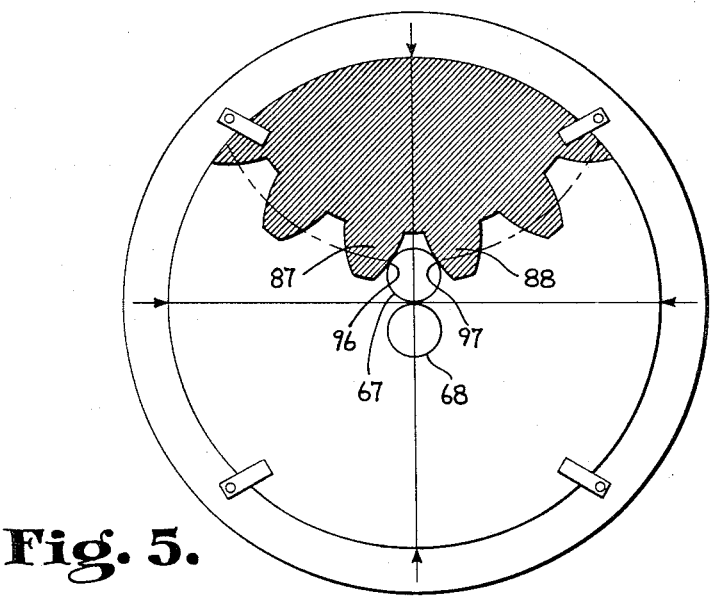
FIGURE 5 is a view like FIGURES 4 and 3 but illustrating the application of the invention to inspection of an external tooth profile rather than an internal tooth profile.
Figure 6:
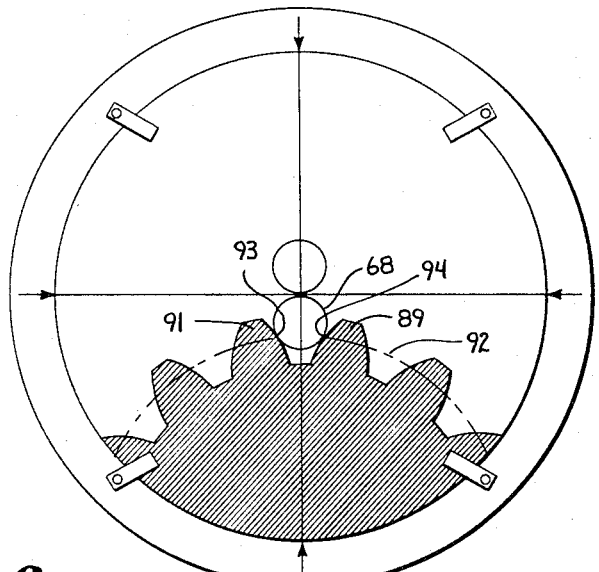
FIGURE 6 is a view like FIGURE 5 but showing a later step in the procedure of inspection of the external tooth gear.

For making an "over the wires" measurement of an external gear, the same general procedure is followed and this is represented in FIGURE 5 wherein the shadow of two teeth 87 and 88 of the gear is made tangent to the upper chart circe 67 at one point on each of the facing surfaces of the teeth 87 and 88, whereupon a micrometer reading is made. Then the table and gear therewith are moved down so that the shadow of the faces of the teeth 89 and 91, diametrically opposite respectively the teeth 87 and 88, are placed tangent the lower chart circle 68. Then another micrometer reading is taken. With these two readings, and considering the use or non-use of a gage block, as required, the effective measurement "over the wires" is determined and from that the pitch diameter of the pitch circle 92 through the points 93 and 94, 96 and 97, is determinable.

From the foregoing description, it should be apparent that the present invention manifestly simplifies the measurement of small parts and particularly small internal gears or dies or cavities for small external gears, such cavities and dies having internally facing teeth. It is also quite useful for small external gear measurements as well as for various types of screws, threads, tools, and other parts and devices.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of inspection of an item having first and second pairs of spaced protrusions, and comprising the steps of:
    projecting a magnified image of predetermined portions of said first pair onto a chart;
    moving said item to a first location establishing tangency of said image of said predetermined portions with a circle on said chart;
    moving a measuring instrument to register said first location;
    projecting a magnified image of predetermined portions of said second pair onto said chart;
    moving said item to a second location establishing tangency of said image of said predetermined portions of said second pair with a circle on said chart;
    and moving a measuring instrument to register said second location.

2. The method of claim 1 wherein:
    said projected predetermined portions of said first pair are portions of said item which face each other;
    said projected predetermined portions of said second pair are portions of said item which face each other;
    said projection being done at the same magnification for the image of said first pair as for the image of said second pair.

3. The method of claim 1 wherein:
    said first location is determined by establishment of tangency with a first circle and
    said second location is determined by establishment of tangency with a second circle tangent said first circle at one point.

4. Inspection apparatus for inspecting an item having measurements of a type determinable by utilization of gage wires with measurements taken across the wires while applied to the item, said apparatus comprising:
    a translucent chart applicable to an optical comparator screen, said chart having a first circle thereon, said circle having a diameter equal to the product of: the diameter of the said gage wires theoretically usable on the item for a measurement across the wires, and; the number of times the item is to be magnified on the comparator to produce an image thereof on the optical comparator screen.

5. The apparatus of claim 4 and further comprising:
    a second circle on said chart identical to said first circle and tangent thereto at one point only,
    and reference means on said chart enabling mounting thereof in a predetermined manner on a comparator screen, said reference means being related to a line connecting the centers of said circles so as to facilitate alignment of said line in parallel relationship to the path of movement on a comparator screen of the image of an item-holding portion of an optical comparator in response to rectilinear movement of the item holding portion.

6. The apparatus of claim 5 and further comprising:

an optical comparator having a screen with said chart secured thereon, said comparator having a rectilinearly-movable, item-holder portion, said comparator projecting onto said screen the image of an item secured in said holder portion for inspection of said item, said line connecting the centers of said circles extending parallel to the direction of movement of said projected image on said screen as said item is moved rectilinearly on said comparator by said holder.

7. Inspection apparatus comprising:

a translucent sheet having a circular marginal edge extending for 360 degrees around a center at uniform radius from said center;

first and second reference lines intersecting at right angles at said center and extending to said marginal edges;

first and second identical circles having their centers located on said first line, said circles lying on opposite sides of said second line and being tangent to each other at said center.

8. The apparatus of claim 7 and further comprising:

a frame;

a holder mounting an item to be inspected, said holder being rectilinearly movable on said frame between first and second positions;

a display screen;

means projecting the image of said item onto said screen;

said sheet overlying said screen in secured relation thereto;

said holder and frame having means thereon for micrometrically moving said holder between said first and second positions and indicating the precise location of said holder at all times, said circles being of a size adapted to two-point tangency with a portion of the image of said item in each of two different locations of said holder as said holder is moved, to enable precise determination of the amount of travel of said holder required for two-point tangency with two different and oppositely disposed portions of said image.

References Cited
UNITED STATES PATENTS 2,949,057    8/1960    Polidor _____ 88—24
3,097,432    7/1963    Shaw _____ 33—50.5

NORTON ANSHER, *Primary Examiner.*

DAVID B. WEBSTER, *Assistant Examiner.*